R. E. HELLMUND.
SYSTEM OF CONTROL.
APPLICATION FILED MAY 8, 1916.
1,231,605.
Patented July 3, 1917.
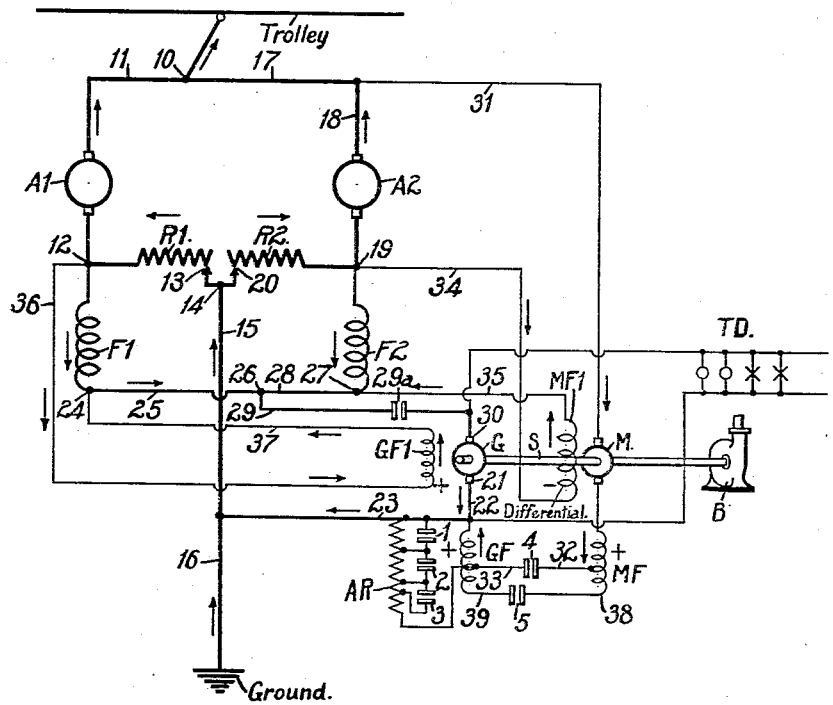
WITNESSES:
R. J. Fitzgerald
W. R. Coley
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTING-HOUSE ELECTRIC AND MANUFACTURING COMPANY, A CORPORATION OF PENNSYLVANIA.

SYSTEM OF CONTROL.

1,231,605.   Specification of Letters Patent.   Patented July 3, 1917.

Application filed May 8, 1916. Serial No. 96,235.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to systems of control for dynamo-electric machines and has special relation to the regenerative control of electric railway motors and the like.

One object of my invention is to provide a system of the above-indicated character which shall be relatively simple and inexpensive in construction and effective and reliable in operation, and which shall embody novel means for producing a desirable negative compounding effect in the momentum-driven machines during the regenerative period, whereby a substantially constant regenerated current is maintained.

More specifically stated, it is an object of my invention to provide an auxiliary motor-generator set or its equivalent for exciting the main machine field winding during the regenerative period, the motor-generator set armature windings being respectively provided with field-magnet windings that are energized in accordance with the voltage of the main field windings and with other field-magnet windings that are so related to the first-mentioned field-magnet windings that the desired negative compounding effect is obtained while maintaining a substantially constant speed of the motor-generator set under varying conditions.

My invention may best be understood by reference to the accompanying drawing, the single figure of which is a diagrammatic view of a system of control embodying my invention.

Referring to the drawing, the system here shown comprises a plurality of supply-circuit conductors respectively marked "Trolley" and "Ground;" a plurality of main dynamo-electric machines respectively having armatures A1 and A2 and field-magnet windings F1 and F2 of the series type; an auxiliary motor-generator set embodying a driving armature winding M, an exciting armature winding G and a plurality of field-magnet windings MF and MF1, and GF and GF1 that are connected in circuit as hereinafter set forth; a blower or other auxiliary load for the driving armature winding M; and a plurality of translating devices TD that are associated with the armature winding G.

The auxiliary armature windings may be mechanically connected in any suitable manner, as by a shaft $s$, upon which the blower B is also mounted, as is customary. The driving armature winding M and the exciting armature G are respectively adapted to be driven from the supply circuit and to excite the main field windings, as hereinafter described in detail. The field windings MF and GF are connected in series relation with the driving armature M and thus the current traversing these field windings varies in accordance with the load of the motor-generator set. The other field-magnet windings MF1 and GF1 for the auxiliary armature windings M and G are connected in parallel relation to the main field windings F2 and F1, respectively.

The translating devices TD are connected directly across the generator armature G, and may comprise various customary devices, such as auxiliary control circuits, an air-compressor motor, a storage battery, etc.

Inasmuch as the particular type of regenerative control system is immaterial to my present invention, I have not deemed it necessary to describe in detail means for connecting the various machines in the illustrated manner or for inaugurating the regenerative operation. The main-circuit connections that are here shown for illustrative purposes only, are fully set forth and claimed in my co-pending application, Serial No. 44,443, filed August 9, 1915.

Assuming that regenerative operation has been started in any suitable manner and that the connections of the various machines are as illustrated in the figure, such connections may be traced as follows: One circuit is established from the Trolley through junction-point 10, conductor 11, main armature winding A1, junction-point 12, main-circuit resistor R1, a switching device 13, here conventionally shown as an arrow-head, junction-point 14 and conductors 15 and 16 to the negative conductor Ground. A second similar main circuit is established from the junction-point 10 through conductors 17 and 18, main armature A2, junction-point 19, main-circuit resistor R2, switching device 20, which corresponds to the other switching device 13, and thence through junction-point 14 as already described.

One terminal 21 of the exciting armature winding G is connected through conductors 22 and 23 to conductor 15 and junction-point 14, where the circuit divides, one branch including switching device 13, main-circuit resistor R1, junction-point 12, main field winding F1, terminal 24 of the field winding F1 and conductor 25 to another junction-point 26, and the other branch including switching device 20, main-circuit resistor R2, junction-point 19, main field winding F2, terminal 27 of the field winding and conductor 28 to the junction-point 26, whence circuit is completed through conductor 29 and switch 29ᵃ to the other terminal 30 of the armature winding G.

An auxiliary circuit is completed, during the regenerative period, from the conductor 17 through conductor 31, the driving armature winding M, a portion of the series field winding MF, conductor 32, switch 4, conductor 33, a portion of the series field winding GF and thence, through conductors 23 and 16, to the negative conductor Ground.

An auxiliary resistor AR is connected in shunt relation to a portion of the series field winding GF, and may be varied by manipulation of a plurality of switches 1, 2 and 3, thereby providing means for regulating the main machine regeneration, and also inherently producing a predetermined voltage-fluctuation damping effect in the auxiliary exciting machine.

A further auxiliary circuit is completed from the junction-point or upper terminal 19 of the main field winding F2 through conductor 34, auxiliary field winding MF1 of the armature winding M and conductor 35 to the lower terminal 27 of the main field winding F2. A similar circuit is completed from the junction-point or upper terminal 12 of the main field winding F1, through conductor 36, auxiliary field winding GF1 of the armature winding G and conductor 37 to the lower terminal 24 of the main field winding F1.

The operation of the above-described system may be set forth as follows: Upon an incipient increase of regenerated current in the main armature A1, for example, a correspondingly increased voltage drop occurs, in the main-circuit resistor R1, whereby an accordingly decreased voltage is available for delivery to the main field winding F1 from the substantially constant-voltage generator armature winding G. The above-mentioned incipient increase of regenerated current, therefore, inherently and automatically effects a predetermined decrease of the corresponding main field-winding current, and, of course, the converse action takes place in case of an incipient decrease of regenerated current in either main armature. The above-outlined inherent regulating action is fully set forth in my above-identified co-pending application, but the description just given is believed to be sufficient for the purposes of the present specification.

The negative compounding effect just described is aided by the field windings MF1 and GF1 which, being directly energized in accordance with the voltages of the respective main field windings, are quick to respond to variations in main field-winding conditions. This is particularly true of the field winding GF1, since the above-mentioned reduction of voltage that is supplied to the main field winding F1 upon an incipient increase of current in the main circuit resistor R1, immediately effects a corresponding reduction of the current traversing the field winding GF1, thereby inherently producing a decreased voltage of the armature winding G, which is essential in obtaining the desired result of a substantially constant regenerated current.

As indicated by the positive signs, the field windings GF and GF1 of the armature winding G have a mutual cumulative effect, whereby the voltage of the armature winding G is readily responsive to variations in the main field-winding exciting current and to the indirectly resulting reduction of motor-generator set load current that traverses the field winding GF; whereas, the field windings MF and MF1 of the armature winding M are respectively adapted to assist and to oppose the voltage of the armature winding, or, in other words, the field windings MF and MF1 are differentially related with respect to each other, as indicated by the positive and negative signs and by the legend "Differential."

It will be observed that, in case of a reduction of current traversing the main field winding F2, a correspondingly decreased voltage will be available for the field winding MF1 of the driving motor armature winding M, thereby tending to strengthen the effective field flux that threads the armature winding M and, consequently, reduce the speed thereof. However, the above-mentioned reduction of main field-winding current produces a corresponding decrease of current traversing the exciting armature winding G, as hereinbefore stated, whereby the load of the motor-generator set is accordingly reduced, or, in other words, a decreased current traverses the driving armature winding M and the series field windings MF and GF. Such reduction of current in the series field winding MF substantially counteracts the previously described decrease of current in the differentially related field winding MF1, thereby tending to maintain a substantially constant effective flux in the driving armature winding M and, therefore, a substantially constant speed of the motor-generator set. The practically constant-speed conditions just mentioned are advantageous in that a change in the speed of the auxiliary machines such as has occurred in various systems of the prior art, involves an undesirable time element in the above-mentioned inherent regulating action, whereby the regenerated current is not maintained within as narrow limits as is possible with the use of my present invention.

Regulation of the system to offset the gradually decreasing vehicle speed may be effected by actuating the switching devices 13 and 20, preferably in accordance with the regenerated current, as set forth in my previously-mentioned application, to gradually exclude the resistors R1 and R2 from circuit, or by manipulating the switches 1, 2 and 3 to correspondingly increase the effect of the series field winding GF. The latter method is advantageous in that relatively small currents are switched. In either case, the main field-winding current is increased as the vehicle speed decreases.

A switch 5 is adapted, when closed, to connect lower terminal-points 38 and 39 of the series field windings MF and GF, for the following reason. During the accelerating period of the main motors, the exciting armature winding G is not used for main field-winding excitation purposes, but the motors are preferably accelerated, in the customary manner, as straight series motors. Under such conditions, the blower B or other auxiliary mechanical load tends to prevent the motor-generator set from over-speeding by reason of the light-load conditions, as will be understood; but, as a further precaution, the switch 5 is closed and the switch 4 is opened to increase the active amount of the series field winding MF, that is, the field excitation of the driving motor armature M, and thus tend to maintain the speed at any predetermined, preferably a substantially constant, value. The switch 29ª may also be opened to disconnect the exciting armature winding G from the main field windings.

However, such change of motor-generator set load of course decreases the current traversing the series field windings MF and GF, or, in other words, the voltage of the exciting armature winding G would be correspondingly and undesirably reduced were it not for the fact that the closure of switch 5 also includes an additional portion of the series field winding GF in circuit. Thus, compensation is made for the changed auxiliary-machine load conditions during the accelerating period, and a desirably constant exciting armature voltage is maintained for use by the hereinbefore-described translating devices TD.

I do not wish to be restricted to the specific circuit connections or location and arrangement of parts herein set forth, as various modifications thereof may be effected without departing from the spirit and scope of my present invention. I desire, therefore, that only such limitations shall be imposed as are indicated in the appended claims.

I claim as my invention:

1. In a system of control, the combination with a plurality of main dynamo-electric machines severally having armatures and field-magnet windings, of a plurality of mechanically-connected armature windings one of which is adapted to excite said field windings, and a plurality of auxiliary field windings for said armature windings respectively energized directly from the main field windings.

2. In a system of control, the combination with a plurality of main dynamo-electric machines severally having armatures and field-magnet windings, of a plurality of mechanically-connected armature windings, one of which is adapted to excite said field windings, a plurality of auxiliary field windings for said armature windings connected in series relation with one of them, and other auxiliary field windings for said armature windings respectively energized directly from the main field windings.

3. In a system of control, the combination with a supply circuit and a main dynamo-electric machine having an armature and a field-magnet winding, of a plurality of mechanically-connected armature windings respectively driven from said supply circuit and connected to energize said field winding, a plurality of auxiliary field windings for said armature windings, and means for exciting at least one of said auxiliary field windings directly from the main field winding.

4. In a system of control, the combination with a supply circuit, and a plurality of main dynamo-electric machines severally having armatures and field-magnet windings, of a plurality of mechanically-connected armature windings respectively driven from said supply circuit and adapted to excite said field windings, and a plurality of auxiliary field windings for said armature windings respectively energized directly from the main field windings.

5. In a system of control, the combination with a supply circuit, and a plurality of main dynamo-electric machines severally having armatures and field magnet windings, of a plurality of mechanically-connected armature windings respectively driven from said supply circuit and adapted to excite said field windings, a plurality of auxiliary field windings for said armature windings connected in series relation with one of them, and other auxiliary field windings respectively energized directly from the main field windings.

6. In a system of control, the combination with a supply circuit and a main dynamo-electric machine having an armature and a field-magnet winding, of a translating device connected in series-circuit relation with the main armature, a plurality of mechanically-connected armature windings respectively driven from said supply circuit and connected to excite said field winding, means for connecting the main field winding and said exciting armature winding in parallel relation to said resistor, and a plurality of auxiliary field windings for the driving armature winding respectively connected in circuit therewith and directly energized from the main field winding.

7. In a system of control, the combination with a supply circuit and a main dynamo-electric machine having an armature and a field-magnet winding, of a translating device connected in series-circuit relation with the main armature, a plurality of mechanically-connected armature windings respectively driven from said supply circuit and connected to excite said field winding, means for connecting the main field winding and said exciting armature winding in parallel relation to said resistor, and a plurality of auxiliary field windings for the driving armature winding respectively connected in circuit therewith and directly energized from the main field winding, said auxiliary field windings being differentially related with respect to each other.

8. In a system of control, the combination with a supply circuit and a main dynamo-electric machine having an armature and a field-magnet winding, of a translating device connected in series-circuit relation with the main armature, a plurality of mechanically-connected armature windings respectively driven from said supply circuit and connected to excite said field winding, means for connecting the main field winding and said exciting armature winding in parallel relation to said resistor, and a plurality of auxiliary field windings for the driving armature winding respectively energized in accordance with the driving armature load and the main field-winding voltage and arranged to mutually maintain a substantially constant driving armature speed under varying conditions.

9. In a system of control, the combination with a supply circuit, and a plurality of main dynamo-electric machines severally having armatures and field-magnet windings, of a plurality of mechanically-connected armature windings respectively driven from said supply circuit and adapted to excite said field windings, a plurality of auxiliary field windings for said armature windings connected in series relation with the driving armature winding, and other auxiliary field windings respectively energized from the main field windings and respectively differentially and cumulatively related to the corresponding series field windings of the driving armature and the exciting armature.

10. In a system of regenerative control, the combination with a main dynamo-electric machine having an armature and a field winding, of a plurality of mechanically-connected armature windings one of which is adapted to excite said field winding under regenerative conditions, a plurality of field-magnet windings for said armature windings, and means for simultaneously varying the active amounts of said field-magnet windings under predetermined conditions.

11. In a system of regenerative control, the combination with a main dynamo-electric machine having an armature and a field winding, of a plurality of mechanically-connected armature windings one of which is adapted to excite said field winding under regenerative conditions, a plurality of field-magnet windings for said armature windings energized in accordance with certain load conditions of said armature windings, and means for maintaining a substantially constant voltage and speed of said armature windings under predetermined varying load conditions.

12. In a system of regenerative control, the combination with a main dynamo-electric machine having an armature and a field winding, of a plurality of mechanically-connected armature windings one of which is adapted to excite said field winding under regenerative conditions, a plurality of field-magnet windings for said armature windings connected in series relation with one of them, and means for simultaneously varying the active amounts of the auxiliary field windings under predetermined conditions.

13. In a system of regenerative control, the combination with a main dynamo-electric machine having an armature and a field winding, of a plurality of mechanically-connected armature windings one of which is adapted to excite said field winding under regenerative conditions, a plurality of field-magnet windings connected in series relation with said driving armature winding, and means for simultaneously increasing the active amounts of the auxiliary field windings to compensate for a predetermined decrease of auxiliary machine load.

14. In a system of regenerative control, the combination with a main dynamo-electric machine having an armature and a field winding, of a plurality of mechanically-connected armature windings one of which is adapted to excite said field winding under regenerative conditions, a plurality of field-magnet windings connected in series relation with said driving armature winding, and switching means for simultaneously connecting additional amounts of the auxiliary field windings in circuit to maintain predetermined voltage and speed conditions of said armature windings upon disconnection of said exciting armature winding from said main field winding.

In testimony whereof, I have hereunto subscribed my name this 29th day of April, 1916.

RUDOLF E. HELLMUND.